(12) United States Patent
Feng et al.

(10) Patent No.: US 12,560,547 B2
(45) Date of Patent: Feb. 24, 2026

(54) FIBER OPTIC PROFILER FOR EARLY DAMAGE WARNING

(71) Applicant: Honeywell International Inc., Charlotte, NC (US)

(72) Inventors: Chen Feng, Mount Laurel, NJ (US); Moin Shafai, Richardson, TX (US); Suresh Venkatarayalu, Waxhaw, NC (US)

(73) Assignee: Honeywell International Inc., Charlotte, NC (US)

( * ) Notice: Subject to any disclaimer, the term of this patent is extended or adjusted under 35 U.S.C. 154(b) by 40 days.

(21) Appl. No.: 18/472,997

(22) Filed: Sep. 22, 2023

(65) Prior Publication Data

US 2025/0102444 A1 Mar. 27, 2025

(51) Int. Cl.
*G01N 21/88* (2006.01)
*G01B 11/16* (2006.01)

(52) U.S. Cl.
CPC ......... *G01N 21/8806* (2013.01); *G01B 11/16* (2013.01); *G01N 2201/06113* (2013.01); *G01N 2201/088* (2013.01)

(58) Field of Classification Search
CPC ....... G01N 15/1459; G01N 2015/1006; G01N 21/45; G01N 15/1404; G01N 15/1409;
(Continued)

(56) References Cited

U.S. PATENT DOCUMENTS

| | | | | | |
|---|---|---|---|---|---|
| 4,812,645 A | * | 3/1989 | Griffiths | ................. | G01P 13/00 |
| | | | | | 385/13 |
| 5,701,006 A | * | 12/1997 | Schaefer | ................ | G01B 11/02 |
| | | | | | 250/227.16 |

(Continued)

FOREIGN PATENT DOCUMENTS

| | | | | | |
|---|---|---|---|---|---|
| CN | 109682321 A | * | 4/2019 | ........... | G01B 11/161 |
| GB | 2532031 A | * | 5/2016 | ............. | G01B 11/18 |

(Continued)

OTHER PUBLICATIONS

Extended European Search Report Mailed on Feb. 3, 2025 for EP Application No. 24195110, 8 page(s).
(Continued)

*Primary Examiner* — Michael P Stafira
(74) *Attorney, Agent, or Firm* — Alston & Bird LLP

(57) ABSTRACT

An example apparatus, method, and computer program product for detecting a change (e.g., deformation) in a surface using optical fibers are provided. The example apparatus may include an optical fiber having a first end and a second end, wherein the optical fiber is positioned in a two-dimensional pattern on a surface. An illumination source is positioned at a first end of the optical fiber and is configured to emit a light output into the first end of the optical fiber. A first optical receiver is also positioned at the first end of the optical fiber, configured to receive reflected light. The apparatus may include a second optical receiver configured to receive transmitted light at the second end of the optical fiber. A change in the surface is detected based at least in part on the reflected light and the transmitted light.

19 Claims, 11 Drawing Sheets

(58) Field of Classification Search

CPC ....... G01N 15/1492; G01N 2015/1481; G01N 21/64; G01N 33/582; G01N 2201/06113; G01N 2021/4709; G01N 33/536; G01N 15/1468; G01N 2021/0346; G01N 21/05; G01N 2291/014; G01N 2291/0258; G01N 29/12; G01N 29/14; G01N 29/2418; G01N 29/2425; G01N 29/262; G01N 33/54373; G01N 2021/058; G01N 2021/458; G01N 21/19; G01N 21/41; G01N 21/4133; G01N 21/75; G01N 2201/0221; G01N 33/53; G01N 11/00; G01N 11/16; G01N 15/0205; G01N 2011/008; G01N 2021/7776; G01N 21/553; G01N 21/658; G01B 9/02001; G01B 11/16; G01B 11/18

See application file for complete search history.

(56) References Cited

U.S. PATENT DOCUMENTS

| | | | | |
|---|---|---|---|---|
| 7,605,923 B2 * | 10/2009 | Williams | ............. | G01M 11/085 356/477 |
| 9,164,027 B2 * | 10/2015 | Nieuwland | ............... | H01S 5/14 |
| 11,635,343 B2 * | 4/2023 | Sarlashkar | ......... | G01M 5/0091 73/760 |
| 2009/0285521 A1 * | 11/2009 | Kunigami | ............. | G01B 11/18 385/13 |
| 2011/0051123 A1 | 3/2011 | Kunigami et al. | | |
| 2016/0025483 A1 * | 1/2016 | Ahlstedt | ................ | G01B 11/18 356/32 |
| 2016/0084640 A1 * | 3/2016 | Hunt | ...................... | G01L 1/246 356/34 |
| 2020/0266913 A1 * | 8/2020 | Kim | ................... | G01D 5/35387 |
| 2021/0231526 A1 * | 7/2021 | Seeley | .................. | G01B 11/18 |
| 2022/0390224 A1 | 12/2022 | Ju et al. | | |

FOREIGN PATENT DOCUMENTS

| | | | | |
|---|---|---|---|---|
| GB | 2608145 A | * | 12/2022 | .......... G01B 11/165 |
| JP | H06-307896 A | | 11/1994 | |
| JP | H09-273906 A | | 10/1997 | |
| JP | 2001-249035 A | | 9/2001 | |
| JP | 2003-065942 A | | 3/2003 | |
| JP | 2010-506170 A | | 2/2010 | |
| KR | 10-2345554 B1 | | 12/2021 | |
| WO | WO-2019018894 A1 | * | 1/2019 | ......... G01D 5/35306 |

OTHER PUBLICATIONS

Haojie Wang et al., "Fiber Optic Sensing Technology and Vision Sensing Technology for Structural Health Monitoring," Sensors, 23(4334):1-40, (2023). [Retrieved from the Internet Sep. 29, 2023: URL: <https://www.mdpi.com/1424-8220/23/9/4334>].

English Translation of JP Office Action dated Sep. 12, 2025 for JP Application No. 2024150441, 3 page(s).

JP Office Action Mailed on Sep. 12, 2025 for JP Application No. 2024150441, 3 page(s).

English Translation of JP Notice of Allowance, including Search Report dated Jan. 6, 2026 for JP Application No. 2024150441, 2 page(s).

JP Notice of Allowance, including Search Report Mailed on Jan. 6, 2026 for JP Application No. 2024150441, 3 page(s).

* cited by examiner

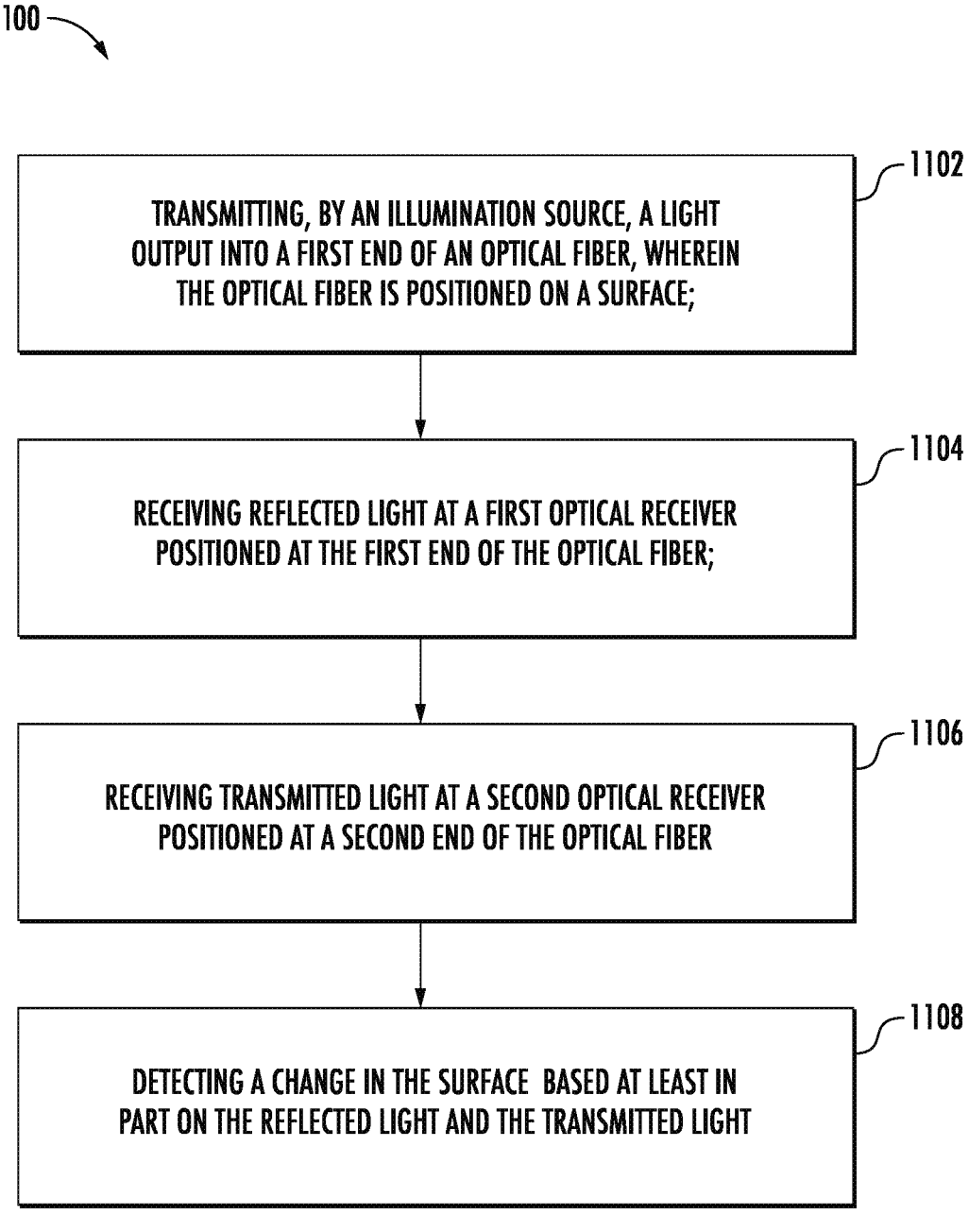

1100

1102

TRANSMITTING, BY AN ILLUMINATION SOURCE, A LIGHT OUTPUT INTO A FIRST END OF AN OPTICAL FIBER, WHEREIN THE OPTICAL FIBER IS POSITIONED ON A SURFACE;

1104

RECEIVING REFLECTED LIGHT AT A FIRST OPTICAL RECEIVER POSITIONED AT THE FIRST END OF THE OPTICAL FIBER;

1106

RECEIVING TRANSMITTED LIGHT AT A SECOND OPTICAL RECEIVER POSITIONED AT A SECOND END OF THE OPTICAL FIBER

1108

DETECTING A CHANGE IN THE SURFACE BASED AT LEAST IN PART ON THE REFLECTED LIGHT AND THE TRANSMITTED LIGHT

FIG. 11

FIBER OPTIC PROFILER FOR EARLY DAMAGE WARNING

TECHNOLOGICAL FIELD

Embodiments of the present disclosure relate generally to detecting deformations in a surface, and more particularly, to using optical fibers to detect deformations in a surface to provide an early warning of damage to the surface.

BACKGROUND

Applicant has identified many technical challenges and difficulties associated with using optical fibers to detect deformations in a surface. Through applied effort, ingenuity, and innovation, Applicant has solved problems related to detecting deformations in a surface using optical fibers by developing solutions embodied in the present disclosure, which are described in detail below.

BRIEF SUMMARY

Various embodiments are directed to an example apparatus, method, and computer program product for detecting a change (e.g., deformation) in a surface using optical fibers. An example apparatus is provided. In some embodiments, the example apparatus may comprise an optical fiber having a first end and a second end, wherein the optical fiber is positioned on a surface. The apparatus may further comprise an illumination source configured to emit a light output into the first end of the optical fiber. The apparatus may further comprise a first optical receiver configured to receive reflected light at the first end of the optical fiber. In addition, in some embodiments, the apparatus may include a second optical receiver configured to receive transmitted light at the second end of the optical fiber. A change in the surface is detected based at least in part on the reflected light and the transmitted light.

In some embodiments, the optical fiber is disposed on the surface in a two-dimensional pattern.

In some embodiments, a two-dimensional position of the change in the surface is determined.

In some embodiments, the first optical receiver is configured to determine a back scatter pattern, wherein the second optical receiver is configured to determine a forward scatter pattern.

In some embodiments, the two-dimensional position of the change in the surface is determined based on a time difference between a back scatter pattern change and a forward scatter pattern change.

In some embodiments, the change in the surface is a deformation of the surface.

In some embodiments, a magnitude of the deformation of the surface is determined based at least in part on at least one of the transmitted light and the reflected light.

In some embodiments, a three-dimensional model of the surface is generated based at least in part on the transmitted light and the reflected light.

In some embodiments, the three-dimensional model includes a two-dimensional position of the change in the surface, and a magnitude of the change in the surface.

In some embodiments, the surface comprises at least a portion of a battery housing.

In some embodiments, a dangerous battery condition is determined based at least in part on the change in the surface.

In some embodiments, the illumination source is a laser diode configured to emit a laser pulse.

An example method is further provided. In some embodiments, the example method may comprise transmitting, by an illumination source, a light output into a first end of an optical fiber, wherein the optical fiber is positioned on a surface. The example method may further comprise receiving reflected light at a first optical receiver positioned at the first end of the optical fiber. In some embodiments, the example method may comprise receiving transmitted light at a second optical receiver positioned at a second end of the optical fiber; and detecting a change in the surface based at least in part on the reflected light and the transmitted light.

In some embodiments, the optical fiber is disposed on the surface in a two-dimensional pattern.

In some embodiments, the example method further comprises determining a two-dimensional position of the change in the surface.

In some embodiments, the example method may further comprise receiving a back scatter pattern at the first optical receiver; and receiving a forward scatter pattern at the second optical receiver.

In some embodiments, determining the two-dimensional position of the change in the surface, further comprises determining a time difference between a back scatter pattern change and a forward scatter pattern change.

In some embodiments, the surface comprises at least a portion of a battery housing.

In some embodiments, the method may further comprise determining a dangerous battery condition based at least in part on the change in the surface.

A computer program product for detecting a change in a surface is also provided. In some embodiments the computer program product may comprise at least one non-transitory computer-readable storage medium having computer-readable program code portions stored therein, the computer-readable program code portions comprising an executable portion configured to: cause an illumination source to transmit a light output into a first end of an optical fiber, wherein the optical fiber is positioned on the surface. In some embodiments, the executable portion may further be configured to receive a reflected light electrical signal representative of the reflected light received at a first optical receiver positioned at the first end of the optical fiber. The executable portion may be further configured to receive a transmitted light electrical signal representative of the transmitted light received at a second optical receiver positioned at a second end of the optical fiber. The executable portion may further be configured to detect the change in the surface based at least in part on the reflected light electrical signal and the transmitted light electrical signal.

BRIEF DESCRIPTION OF THE DRAWINGS

Reference will now be made to the accompanying drawings. The components illustrated in the figures may or may not be present in certain embodiments described herein. Some embodiments may include fewer (or more) components than those shown in the figures in accordance with an example embodiment of the present disclosure.

FIG. 11 depicts a flow diagram of an example method for detecting a change in a surface in accordance with an example embodiment of the present disclosure.

DETAILED DESCRIPTION

Figure 1:
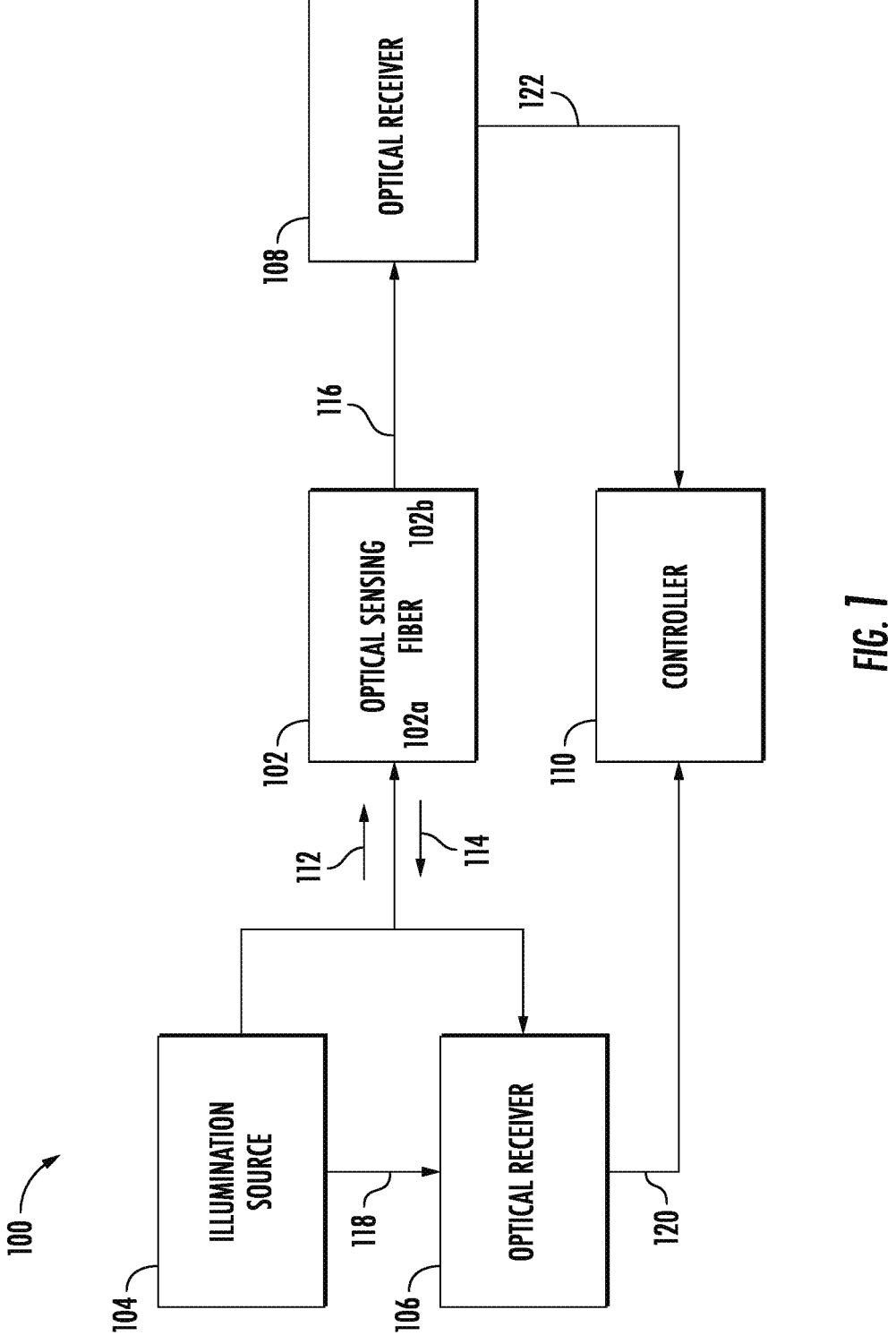
FIG. 1 illustrates an example block diagram of an example fiber optic profiler in accordance with an example embodiment of the present disclosure.

Example embodiments will be described more fully hereinafter with reference to the accompanying drawings, in which some, but not all embodiments of the inventions of the disclosure are shown. Indeed, embodiments of the disclosure may be embodied in many different forms and should not be construed as limited to the embodiments set forth herein; rather, these embodiments are provided so that this disclosure will satisfy applicable legal requirements. Like numbers refer to like elements throughout.

Various example embodiments address technical problems associated with detecting changes and/or deformations in a surface using an optical fiber. As understood by those of skill in the field to which the present disclosure pertains, there are numerous example scenarios in which detecting changes in a surface using optical fiber may be useful. For example, deformation of one or more surfaces of a battery housing may be an indication of a dangerous battery condition, such as thermal runaway.

In general, batteries (e.g., lithium-ion batteries, lithium-polymer batteries, etc.) may undergo a chemical reaction within a battery cell to supply power to various devices. Devices requiring substantial amounts of power, such as electric vehicles, may contain tens, hundreds, or even thousands of battery cells within a battery housing.

In certain circumstances, the movement of electrons and lithium ions in the battery cell may produce gas and heat faster than the battery housing can dissipate the generated gas and heat. The excess gas and heat may lead to pressure build-up within the battery housing. In some instances, a dangerous condition in an individual battery cell, such as an uncontrollable rise in temperature, may have an adverse effect on neighboring battery cells within a battery housing. Eventually, a battery cell and/or battery pack, may combust or explode causing an extremely hazardous condition. A battery pack may progress through the stages of decay rapidly, providing little time to detect and mitigate the hazardous condition before the chain reaction is irreversible.

In some instances, bulging or deformation of a battery housing may result from stress and abuse of the battery cells. Sometimes, such abuse may be immediate and apparent, for example, a battery cell on an electric vehicle may be punctured or ruptured by flying debris. In other instances, the abuse may occur over an extended period of time. For example, overcharging, over-discharging, exposure to high and low temperatures, and/or physical damage to the battery cells over an extended period of time may affect the internal operation of the battery cells, resulting in a bulging or deformed battery housing. Due to the concealed nature of many of these factors and the sudden onset of dangerous battery conditions, it can be difficult to predict and/or detect a dangerous battery condition before it is too late.

The onset of a dangerous battery condition may be preceded by various stages of battery decay, resulting in physical changes to the battery housing. For example, the battery cell may experience electrolysis, electrolyte vaporization, venting, and other events that lead to increased pressure and heat within the battery housing. Detecting deformations in the battery housing may provide an early indication of a dangerous battery condition enabling the use of mitigating actions in response to the condition.

Some current battery monitoring systems may utilize various sensors in close proximity to the battery cells to determine the condition of the battery cell based on the physical characteristics of the environment in and around the battery housing. For example, a temperature sensor may be placed on or near the surface of the battery cell. When the temperature measurement exceeds a pre-determined max operating temperature, the battery monitoring system may issue a warning or alert. Similarly, pressure sensors may be placed on or near the surface of the battery cell and may be configured to transmit an alert when the pressure within a battery pack exceeds a pre-determined max operating pressure. Detection systems utilizing temperature sensors and pressure sensors are often expensive and may be difficult to configure within the confines of a battery pack. In addition, temperature and pressure sensors may not provide an indication of a dangerous battery condition until the onset of the dangerous battery condition is irreversible.

The various example embodiments described herein utilize various techniques to detect changes in a surface (e.g., a battery housing surface) using optical fibers. For example, in some embodiments, an illumination source may emit a light output in a first end of an optical fiber. The optical fiber may be positioned on a surface and patterned to substantially cover that surface. A portion of the light output may be reflected back (e.g., reflected light) to the first end of the optical fiber due to irregularities in the optical fiber, stretching/compression of the optical fiber, curves/bends in the optical fiber, and other physical conditions of the optical fiber. An optical receiver may be positioned at the first end of the optical fiber to receive the reflected light and record a back scatter pattern (e.g., the pattern of light received at the photodiode).

Similarly, a portion of the light output may be transmitted through the optical fiber (e.g., transmitted light) and received at an optical receiver positioned at the second end of the optical fiber. The optical receiver positioned at the second end of the optical fiber may record a forward scatter pattern.

In an instance in which the physical structure of the optical fiber changes due to a deformation of the surface to which the optical fiber is adhered, the back scatter pattern and/or the forward scatter pattern may change. The change in scatter pattern may be used to determine the location and magnitude of the deformation.

For example, in some embodiments, the back scatter pattern and the forward scatter pattern may be monitored by a controller. In an instance in which a deformation occurs in the surface, a strain occurs in the optical fiber. The strain in the optical fiber may cause a change in both the forward scatter pattern and the back scatter pattern. By continually monitoring both the forward scatter pattern and the back scatter pattern, the controller may determine the time at which the forward scatter pattern and the back scatter pattern change due to the deformation. The controller may then compare the time at which the forward scatter pattern changes in relation to the back scatter pattern. The difference in times may be used to pinpoint the location of the strain in the optical fiber, and thus the deformation on the attached surface. By utilizing the change in time relative to each other, unmodified, off-the-shelf optical fiber may be used to provide precise locations. Utilizing unmodified, off-the-shelf optical fiber enables larger surfaces to be covered at a lower cost.

As a result of the herein described example embodiments and in some examples, the effectiveness of deformation detection using optical fibers may be greatly improved. In addition, the use of unmodified optical fibers to perform precise strain detection within an optical fiber may reduce the manufacturing complexity and overall cost of deformation detection on a surface.

Referring now to FIG. 1, an example fiber optic profiler 100 is provided. As depicted in FIG. 1, the example fiber optic profiler 100 includes an optical fiber pattern 102 (e.g., optical sensing fiber) optically coupled to an illumination source 104 and a first optical receiver 106 at a source end 102*a* and optically coupled to a second optical receiver 108 at a terminal end 102*b*. The illumination source 104 is configured to emit light output 112 into the optical fiber pattern 102, such that the transmitted light 116 is received at the second optical receiver 108 and the reflected light 114 is received at the first optical receiver 106. A reference signal 118 is further transmitted from the illumination source 104 to the first optical receiver 106. As further depicted in FIG. 1, a controller 110 is electrically connected to the first optical receiver 106 and configured to receive a reflected light electrical signal 120, associated with the reflected light 114 received at the first optical receiver 106. The controller 110 is further electrically connected to the second optical receiver 108 and configured to receive a transmitted light electrical signal 122, associated with the transmitted light 116 received at the second optical receiver 108.

Figure 2:
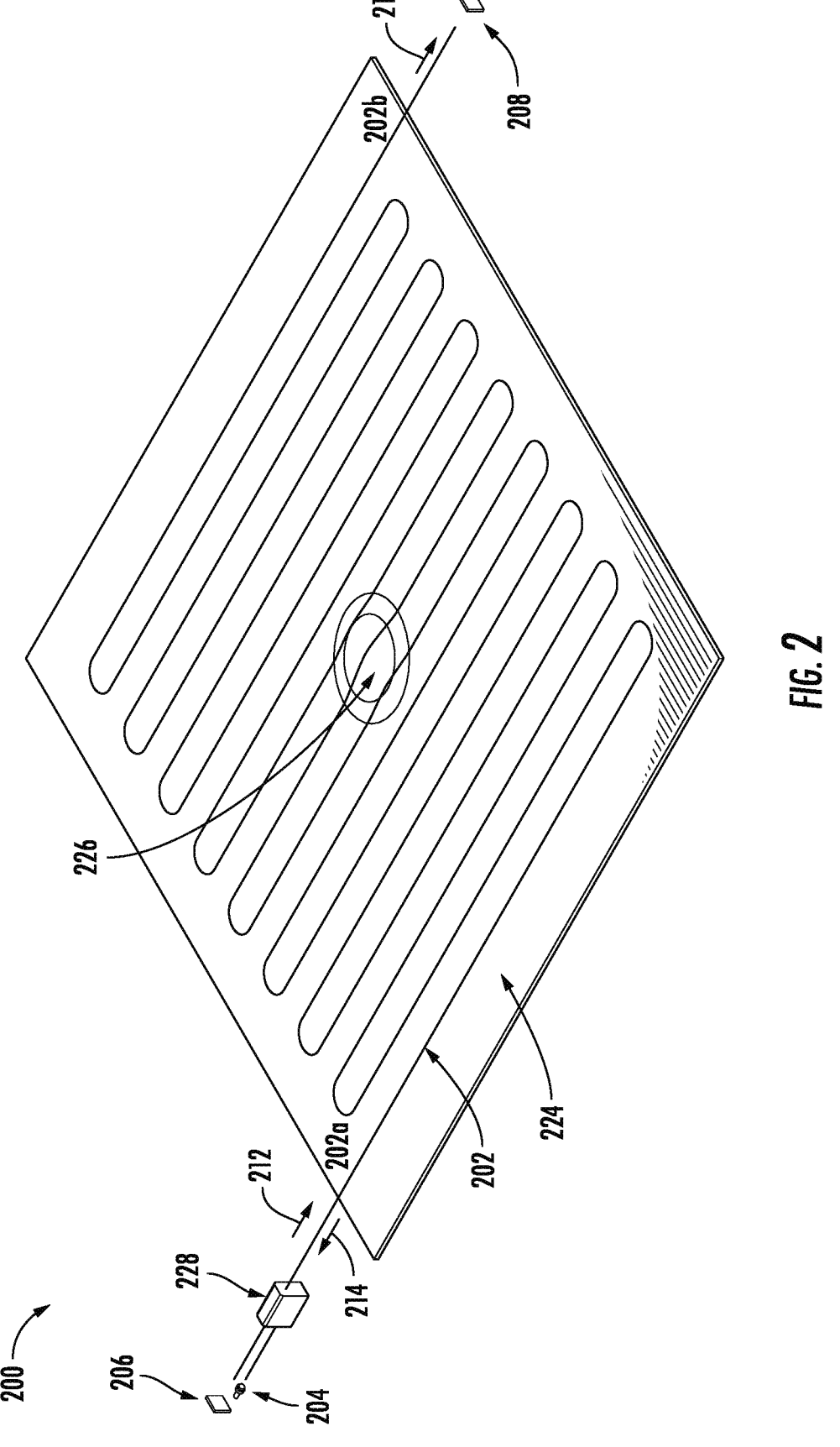
FIG. 2 illustrates an example embodiment of a fiber optic profiler on a surface in accordance with an example embodiment of the present disclosure.

As depicted in FIG. 1, the example fiber optic profiler 100 includes an optical fiber pattern 102. The optical fiber pattern 102 is any length of optical fiber, configured to receive light output 112 at a source end 102*a* and transmit the light output 112 through an optical transmission media to a terminal end 102*b*. The optical fiber pattern 102 is attached to a surface (as depicted in FIG. 2) such that changes in the surface compress and/or stretch the optical fiber pattern 102. An optical fiber comprising the optical fiber pattern 102 may include optically coupled junctions, occlusions, and/or other irregularities that cause a portion of the light output 112 travelling through the optical fiber pattern 102 to be reflected toward the source end 102*a* of the optical fiber pattern 102.

The reflected light 114 generates a back scatter pattern. A scatter pattern (e.g., speckle pattern) is a pattern of light output formed by constructive and destructive interference of light waves as the light travels through the optical fiber pattern 102. The scatter pattern is determined by the various structures within the optical fiber. A scatter pattern may be used to determine changes in the fiber optic structure of the optical fiber pattern 102. For example, changes due to compression and/or stretching of the optical fiber.

In addition, a portion of the light output 112 is transmitted through the optical transmission media comprising the optical fiber pattern 102 and received at the terminal end 102*b*. The transmitted light 116 generates a forward scatter pattern when received by the second optical receiver 108.

In some embodiments, the optical fiber pattern 102 may comprise unmodified, off-the-shelf optical fiber. Unmodified optical fiber is free of any intentional structures, such as fiber Bragg grating or other optical structure. However, unmodified optical fiber comprises certain abnormalities inherent in the manufacturing process of the optical fiber.

As further depicted in FIG. 1, the example fiber optic profiler 100 includes an illumination source 104. An illumination source 104 is any single light source or array of light sources configured to produce light output 112 configured to at least partially transmit through an optical fiber (e.g., optical fiber pattern 102). The illumination source 104 may be any semiconductor, diode, or other photon emitting structure configured to generate laser light output 112. The illumination source 104 may be configured to generate light output 112 at a specific wavelength or spectrum of wavelengths. For example, the illumination source 104 may be configured to generate light output 112 having a wavelength between 780 nanometers and 2200 nanometers. In some embodiments, the illumination source 104 may be a laser diode.

As further depicted in FIG. 1, the illumination source 104 is further configured to transmit a reference signal 118 to the first optical receiver 106. The reference signal 118 is a portion of the light output 112. A reference signal 118 may be created by transmitting the light output 112 through an optical beam splitter. The reference signal 118 may be utilized to compare the light output 112 with the reflected light 114.

As further depicted in FIG. 1, the example fiber optic profiler 100 includes a first optical receiver 106 and a second optical receiver 108. An optical receiver 106, 108 is any device, sensor, photodiode, or other structure that produces an electric current (e.g., reflected light electrical signal 120, transmitted light electrical signal 122) corresponding to the light received (e.g., reflected light 114, transmitted light 116) at the optical receiver 106. An optical receiver 106, 108 may comprise an array of pixels, each configured to convert photons into an electric current. The optical receiver 106, 108 may be configured to capture a scatter pattern, or speckle pattern by converting the intensity of light received at each pixel of the optical receiver 106, 108 into an electric current. In some embodiments, the example optical receiver 106, 108 may be configured to generate an electric current (e.g., reflected light electrical signal 120, transmitted light electrical signal 122) comprising a set or array of intensities forming the scatter pattern for the corresponding optical receiver 106, 108.

As further depicted in FIG. 1, the example fiber optic profiler 100 includes a controller 110. A controller 110 is any computing device electrically connected to the first optical receiver 106 and the second optical receiver 108 and configured to receive the reflected light electrical signal 120 and the transmitted light electrical signal 122 and detect a change in the corresponding surface based on the received electrical signals. A controller 110 may utilize the intensity of the light received at the first optical receiver 106 and the second optical receiver 108 to determine the magnitude or height of the deformation. For example, a deformation with a large magnitude, or height, may significantly alter the optical fiber pattern 102 on the attached surface. Thus, a drastic change in the scatter pattern may indicate a significant distention of the attached surface. Similarly, significant loss and/or reflection in the optical fiber may be an indicator of the change and/or deformation's magnitude. An example controller 110 architecture is described further in relation to FIG. 8.

In addition to determining the magnitude (e.g., height) of the deformation, the controller 110 may utilize the reflected light electrical signal 120 and the transmitted light electrical signal 122 to determine the location of one or more deformations in the attached surface. In some embodiments, the controller 110 may determine the location of the one or more deformations based on the time difference between a change in the forward scatter pattern and the back scatter pattern. The determination of the precise location of one or more deformations on the attached surface is described further in relation to FIG. 2.

Referring now to FIG. 2, an example fiber optic profiler 200 is provided. As depicted in FIG. 2, the example fiber optic profiler 200 includes an optical fiber pattern 202 attached to a surface 224. The optical fiber pattern 202 is configured to receive light output 212 from an optically coupled illumination source 204 through a fiber optic coupler 228 at a source end 202a of the optical fiber pattern 202. A portion of the light output 212 is transmitted through the optical fiber pattern 202 and received at a terminal end 202b of the optical fiber pattern 202 as transmitted light 216 by an optically coupled second optical receiver 208. As further depicted in FIG. 2, a portion of the light output 212 is reflected back to the source end 202a of the optical fiber pattern 202 and received as reflected light 214 by an optically coupled first optical receiver 206. As shown in FIG. 2, the first optical receiver 206 and the illumination source 204 are both optically coupled to the optical fiber pattern 202 by a fiber optic coupler 228. FIG. 2 further illustrates a deformation 226 in the surface 224 to which the optical fiber pattern 202 is attached.

As depicted in FIG. 2, the example fiber optic profiler 200 is attached to a surface 224. The surface 224 may comprise any area, shape, material, or structure to which an optical fiber pattern 202 may be attached such that light output 212 may be transmitted through the optical fiber pattern 202. Although depicted as a flat surface in FIG. 2, the surface 224 may comprise any shape or structure. In some embodiments, the surface 224 may be a surface of a battery case, package, pack, or housing. In such an instance, a deformation (e.g., deformation 226) on the surface 224 may be an indication of an underlying dangerous battery condition, such as pressure build-up in the interior of the battery compartment, excessive heat on or around the battery, and/or the onset of a thermal runaway event.

As further depicted in FIG. 2, the attached surface 224 includes a deformation 226. A deformation 226 is any abnormality, protrusion, indent, distortion, warping, bending, or other change in the physical structure of the surface 224. Because the fiber optic profiler 200 is configured to detect a change in the surface 224, any change to the surface 224 may be detected as a deformation 226.

As described in relation to FIG. 1, the fiber optic profiler 200 is configured to determine the location of any deformation 226 on the attached surface 224. During operation, the fiber optic profiler 100 may continually transmit light output 212 in pulses or as a continuous light source, through the optical fiber pattern 202. The controller (e.g., controller 110 as depicted in FIG. 1) continually receives scatter patterns via each of the electrical signals (e.g., the reflected light electrical signal 120 and the transmitted light electrical signal 122). A change in scatter pattern due to a deformation 226 in the attached surface 224 may cause a change in the scatter pattern. Depending upon when the change in scatter pattern is detected at the first optical receiver 206 and the second optical receiver 208, the location within the optical fiber pattern 202 may be determined.

For example, in general, in an instance in which the change in scatter pattern is first detected in the back scatter pattern received at the first optical receiver 206, the deformation is in the first half of the optical fiber pattern 202. Similarly, in an instance in which the change in scatter pattern is first detected in the forward scatter pattern received at the second optical receiver 208, the deformation is in the second half of the optical fiber pattern 202. Further, in an instance in which the change in scatter pattern is detected at the first optical receiver 206 and the second optical receiver 208 at precisely the same time, the deformation is in the exact middle of the optical fiber pattern 202.

By these general principles, the precise location within the optical fiber pattern 202 may be determined. For example, the precise location of the deformation along the length (L) of the optical fiber comprising the optical fiber pattern 202 may be determined using an equation similar to the following:

$$d_{DEF} = \frac{L}{2} * \left(1 + \frac{t_{term} - t_{source}}{t_{total}}\right)$$

where $d_{DEF}$ is the distance to the deformation 226 along the length of the optical fiber pattern 202, L is the length of the optical fiber pattern 202, $t_{term}$ is the time the change in forward scatter pattern is detected at the terminal end 202b of the optical fiber pattern 202, $t_{source}$ is the time the change in back scatter pattern is detected at the source end 202a of the optical fiber pattern 202, and $t_{total}$ is the total time for the light output 212 to travel through the optical fiber pattern 202.

As a specific example, in an instance in which the total time ($t_{total}$) for a light output 212 pulse to traverse a five meter long optical fiber pattern 202 is 25 nanoseconds (noting in a typical fiber with refractive index of 1.5, light travels 1.5 times as slow), and in an instance in which the change in scatter pattern is detected at the first optical receiver 206 five nanoseconds before the change in scatter pattern is detected at the second optical receiver 208, the controller may determine that the location of the deformation 226 is:

$$d_{DEF} = \frac{5 \text{ meters}}{2} * \left(1 + \frac{-5 \text{ ns}}{20 \text{ ns}}\right) = \frac{5 \text{ meters}}{2} * \left(\frac{15}{20}\right) = 1.88 \text{ meters}$$

The above equation indicates that the deformation is 1.88 meters from the source end of the optical fiber pattern 202. In an instance in which the layout of the optical fiber pattern 202 on the attached surface 224 is known, the precise two-dimensional location of the deformation 226 may be determined.

By determining the precise location of the deformation 226 on the attached surface based on the relative arrival times of the change in forward scatter pattern versus the change in back scatter pattern, simple, low-cost components may be used. Using two data points to precisely determine the location of the deformation 226, both of which are determined using low-cost components, nullifies the larger standard error of each of the components in the overall result. Thus, there is no need for ultra-precise, expensive optical receivers and illumination sources.

In some embodiments, the location may be determined using a single optical receiver positioned at the source end 202*a* or the terminal end 202*b* of the optical fiber pattern 102. In such an instance, the precise location of the deformation 226 may be determined based on the change in scatter pattern detected at one end of the optical fiber pattern. An example fiber optic profiler 100 utilizing a single optical receiver is described further in relation to FIG. 7.

Figure 3B:
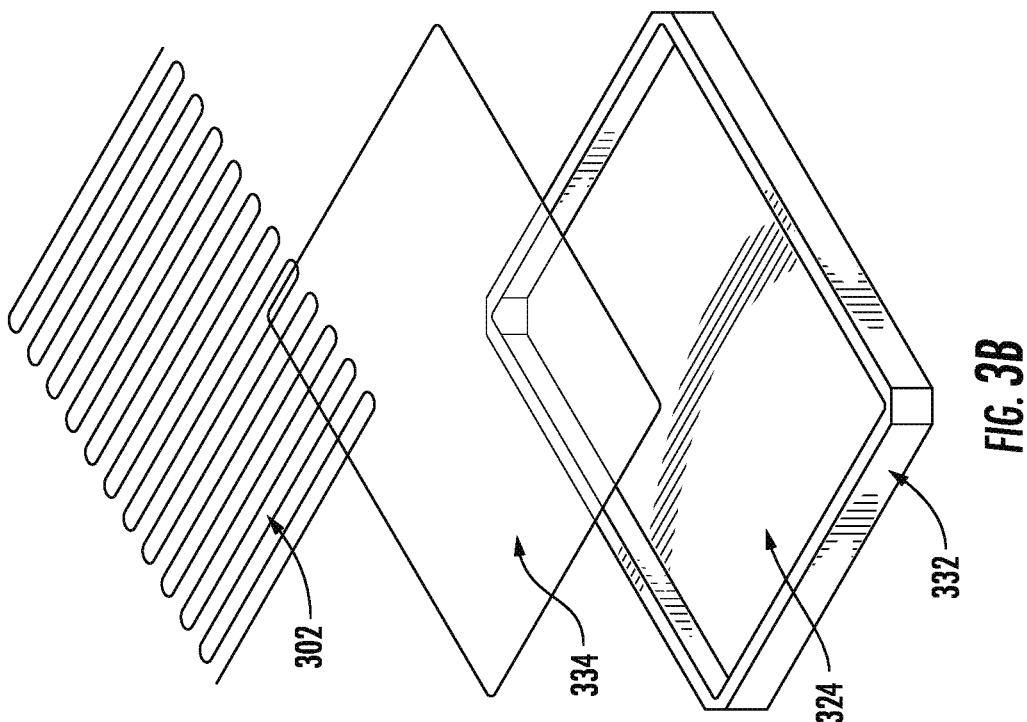
FIG. 3A-FIG. 3B illustrate an example battery housing tray and an exploded view of an example battery housing tray comprising a fiber optic pattern in accordance with an example embodiment of the present disclosure.
Figure 3A:
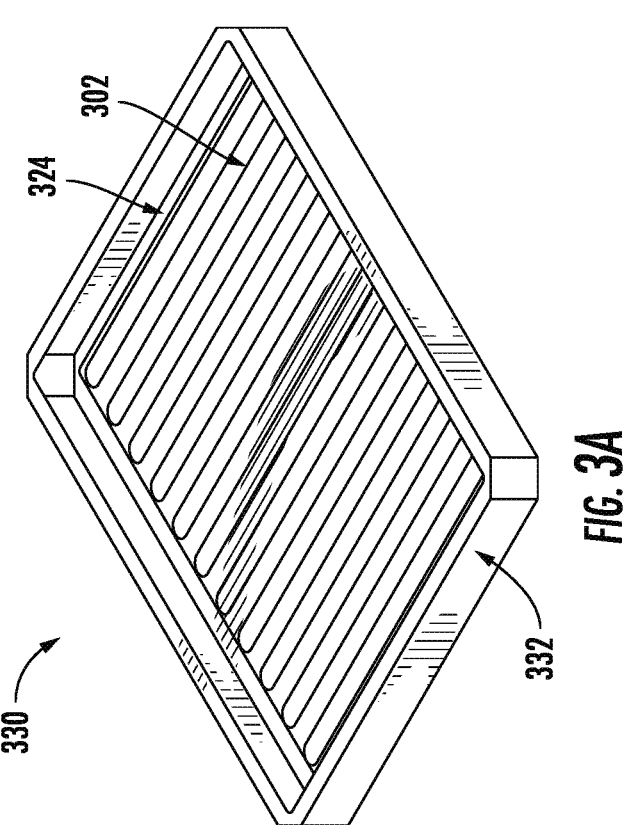

Referring now to FIG. 3A-FIG. 3B, an example battery housing tray 330, comprising an optical fiber pattern 302, is provided. As depicted in FIG. 3A and FIG. 3B, the optical fiber pattern 302 of an example fiber optic profiler is attached to a surface 324 of a battery housing 332. As further depicted in FIG. 3A and FIG. 3B, the optical fiber pattern 302 is attached to the surface 324 using a bonding layer 334.

As depicted in FIG. 3A and FIG. 3B, the optical fiber pattern 302 is attached to a surface 324 of a battery housing 332. A battery housing 332 may be any structure, packaging, enclosure, and/or compartment for enclosing and/or protecting the internal components of a battery. The battery housing 332 may further define a space or compartment into which the internal battery components and battery cells may be disposed. In some embodiments, the battery housing 332 may comprise aluminum, steel, or other metals; plastics and/or reinforced plastics; or any other material capable of protecting the interior components of the battery pack. In some embodiments, the battery housing 332 may provide structures to support, attach, and/or separate the battery cells, as well as wiring, and/or other internal components of the battery pack. Many electric vehicles today have begun arranging large numbers of battery cells into a battery housing 332 that is integrated as part of the body of the electric vehicle. This technology has largely come to be known as cell-to-chassis technology. Such a battery arrangement may be particularly prone to dangerous battery conditions, such as thermal runaway and/or eventual combustion as a result of mechanical, electrical and/or thermal stress and abuse. By attaching the optical fiber pattern 302 to one or more surfaces 324 of the battery housing 332 deformations in the battery housing 332 may be detected, indicating the onset of a dangerous battery condition.

As further depicted in FIG. 3A and FIG. 3B, the optical fiber pattern 302 is attached to the surface 324 of the battery housing 332 using a bonding layer 334. A bonding layer 334 is any substance, structure, or device used to attach the optical fiber pattern 302 to the surface 324 of the battery housing 332. The optical fiber pattern 302 is attached to the surface 324 such that in an instance in which the surface 324 changes and/or deforms, the optical fiber pattern is also deformed. Stretching and/or compression of the optical fiber pattern 302 due to deformations on the surface 324 cause changes in the forward scatter pattern and back scatter pattern of the light output (e.g., light output 112, 212) travelling through the optical fiber of the optical fiber pattern 302.

Figures 4A, 4B:
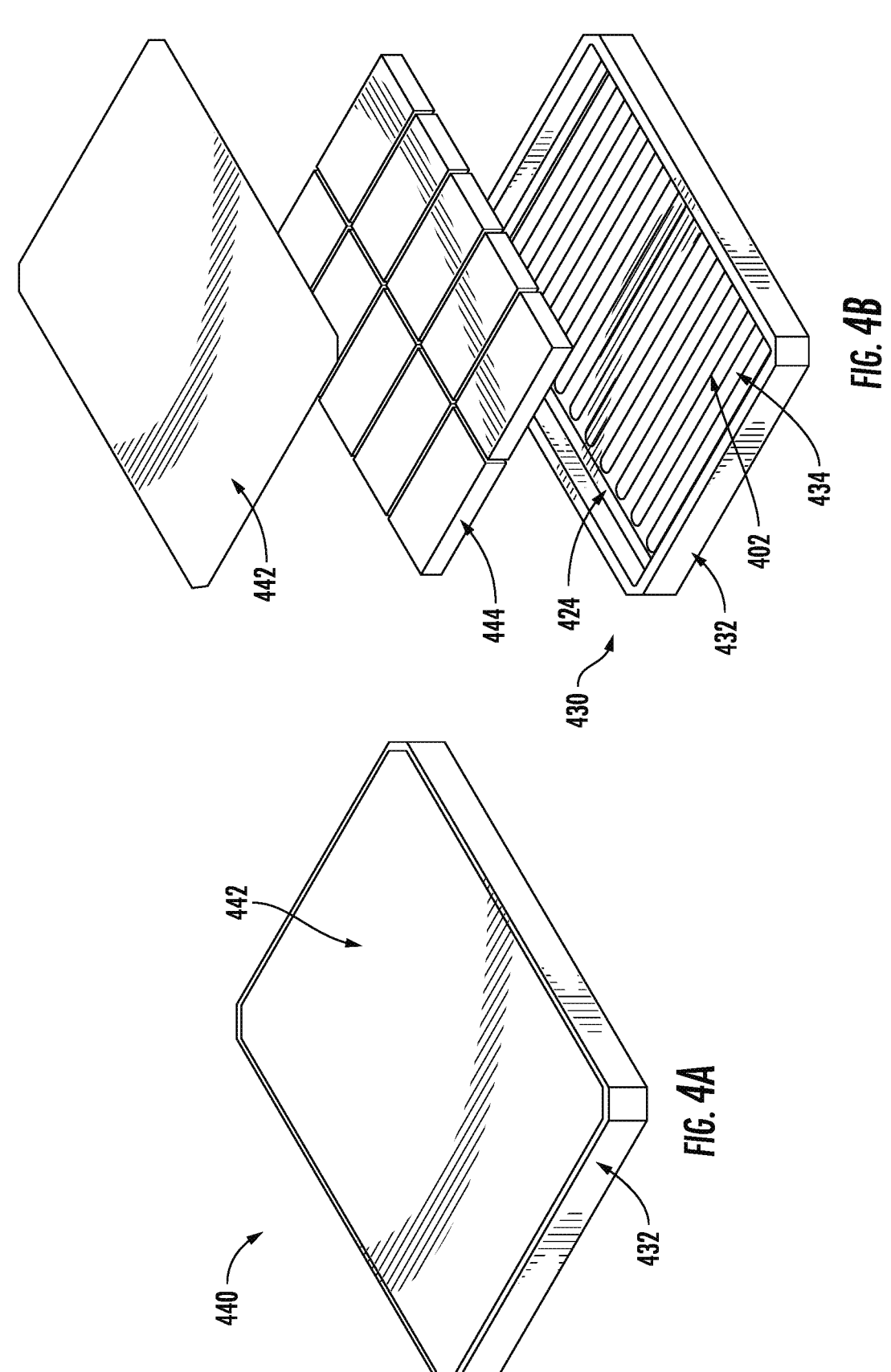
FIG. 4A-FIG. 4B illustrate an example battery housing and an exploded view of an example battery housing comprising a fiber optic pattern in accordance with an example embodiment of the present disclosure.

Referring now to FIG. 4A-FIG. 4B, an example battery pack 440 is provided. As depicted in FIG. 4A, the example battery pack 440 includes a battery housing 432 and a battery cover 442, the battery housing 432 and the battery cover 442 completely enclosing the internal components of the battery pack 440.

As further depicted in FIG. 4B, the example battery pack 440 includes a plurality of battery cells 444 positioned within the battery housing 432. A battery cell 444 may be any electrochemical device utilizing chemical reactions to generate electrical energy. Chemical reactions within a battery cell 444 may involve transmitting ions between a positively charged electrode (cathode) and a negatively charged electrode (anode). When a battery cell 444 provides power to a load, the flow of the electrons from the anode to the cathode generates electric current flowing from cathode to the anode. A battery cell may contain any of a large variety of chemical compositions (e.g., lithium-nickel-manganese-cobalt oxides, lithium-iron phosphates, etc.). A battery cell 444 facilitating such chemical reactions may be susceptible to a number of dangerous battery conditions resulting in deformation of the battery housing 432 and or battery cover 442. For example, the battery cells 444 may produce excess heat and/or gas, causing the pressure within the battery pack 440 to spike.

As further depicted in FIG. 4B, the optical fiber pattern 402 may be attached to the bottom surface 424 of the battery housing 432 within the battery housing tray 430, using a bonding layer 434. As such, any deformation caused by the battery cells 444, or otherwise, may cause stress and/or compression in the optical fiber pattern 402. Detecting the deformation may enable detection of a dangerous battery condition.

Figures 5A, 5B:
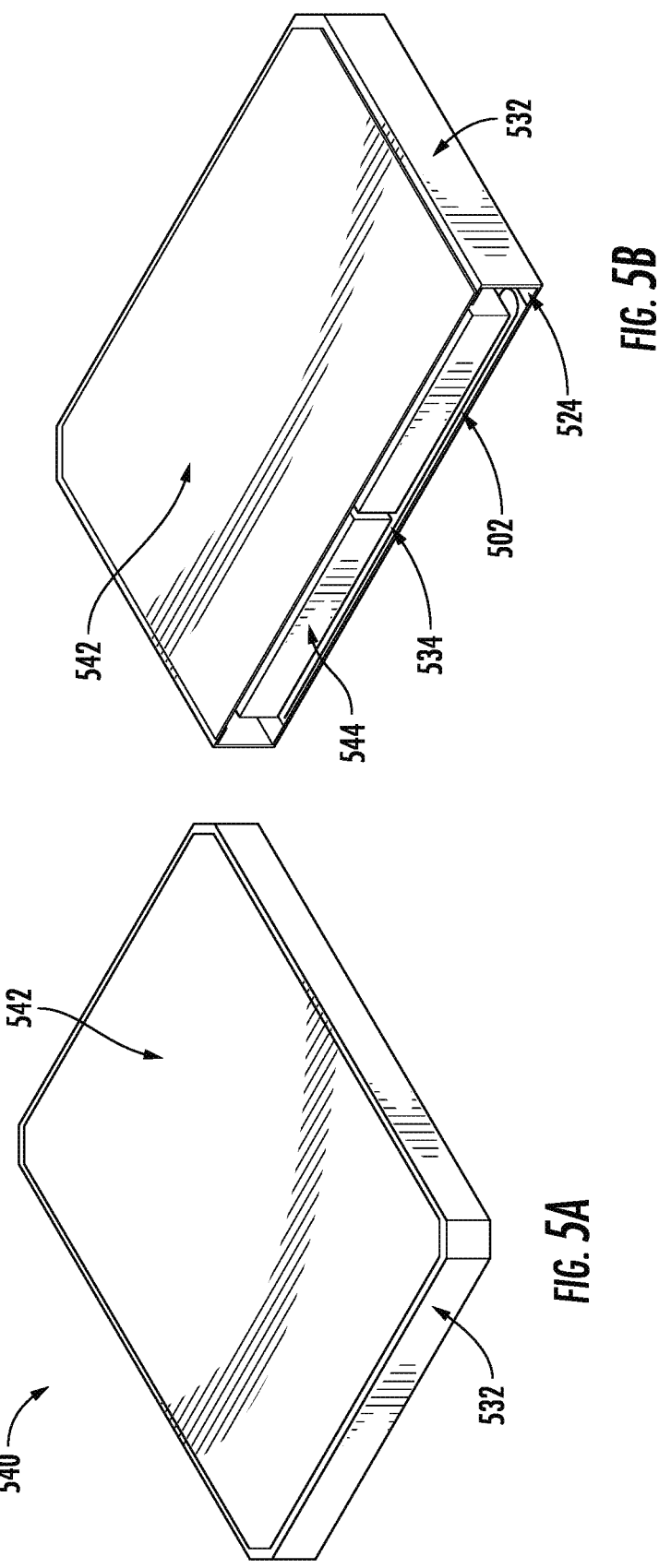
FIG. 5A-FIG. 5B illustrate an example battery housing and a cross-section view of an example battery housing in accordance with an example embodiment of the present disclosure.

Referring now to FIG. 5A-5B, an example battery pack 540 and a cross-section view of the battery pack 540, are provided. As depicted in FIG. 5A, the example battery pack 540 includes a battery housing 532 and a battery cover 542, the battery housing 532 and the battery cover 542 completely enclosing the internal components of the battery pack 540.

As further depicted in FIG. 5B, optical fiber pattern 502 is attached to a surface 524 of the battery cover 542 by a bonding layer 534. The plurality of battery cells 544 are further shown in close proximity to the optical fiber pattern 502 within a common internal compartment created by the battery housing 532 and the battery cover 542.

Figure 6:
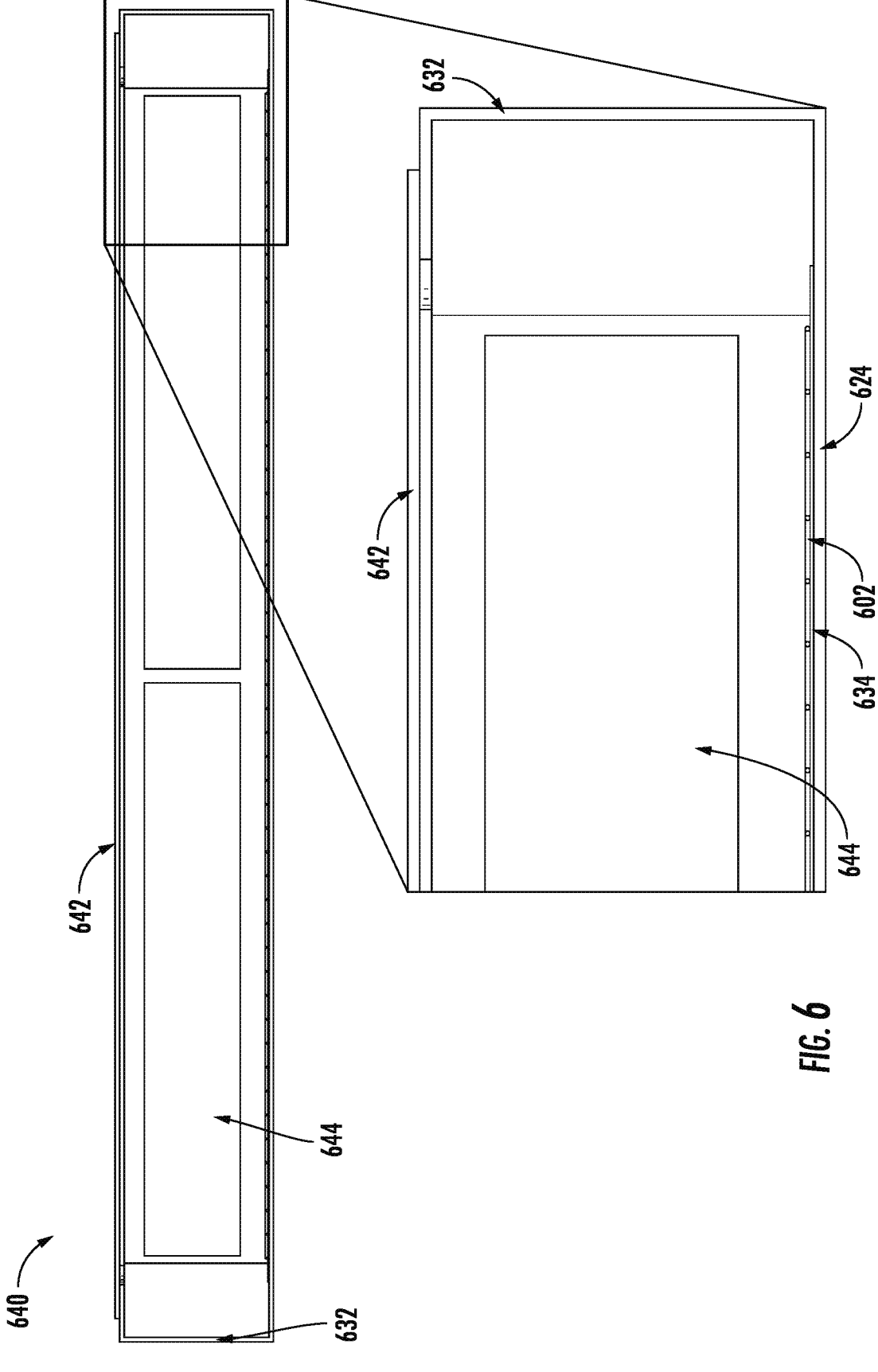
FIG. 6 illustrates a close-up view of a cross-section of an example battery housing in accordance with an example embodiment of the present disclosure.

Referring now to FIG. 6, a close-up view of a cross-section of an example battery pack 640, is provided. As depicted in FIG. 6, the battery housing 632 and the battery cover 642 form an enclosure around the plurality of battery cells 644. As further depicted in FIG. 6, an optical fiber pattern 602 is attached to a surface 624 of the battery housing 632 proximate the plurality of battery cells 644, with a bonding layer 634. Any deformation in the surface 624 due to the decay of the battery cells 644, or any other change in the surface 624, may be detected by the strain imposed on the attached optical fiber pattern 602.

Figure 7:
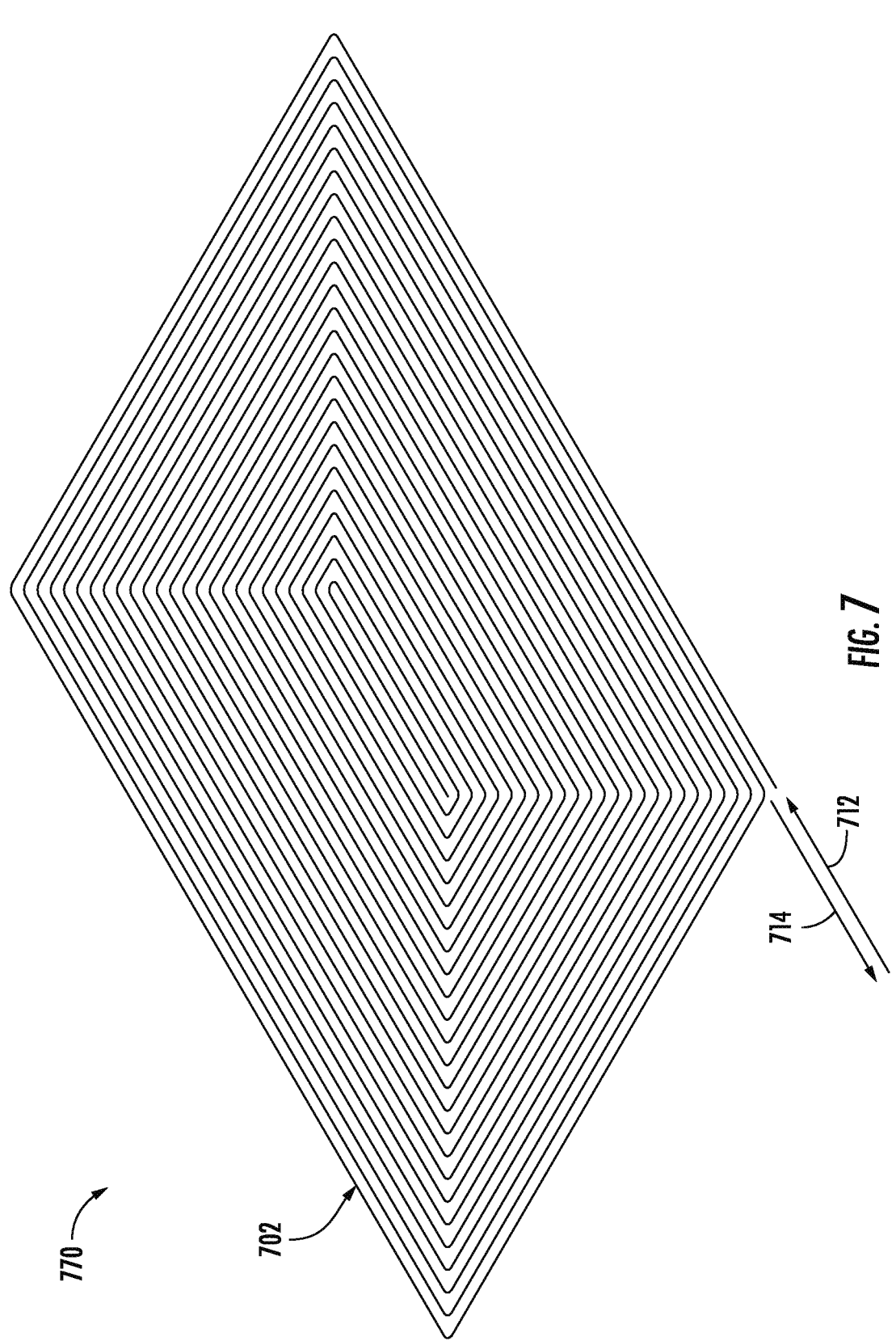
FIG. 7 illustrates an example embodiment of an optical fiber pattern in accordance with an example embodiment of the present disclosure.

Referring now to FIG. 7, an alternative optical fiber pattern 702 is provided. As depicted in FIG. 7, a single end of the optical fiber comprising the optical fiber pattern 702 is accessible. In such an embodiment, the light output 712 may be transmitted into the exposed end. In such an embodiment, the location of any deformation may be determined based on the time a change in the back scatter pattern is detected, evidenced by the reflected light 714.

Although not depicted in FIG. 7, in some embodiments, a fiber optic profiler may include a single optical receiver (e.g., optical receiver 108, 208) optically coupled to an exposed terminal end of an optical fiber pattern. In such an embodiment, the location of any deformation may be determined based on the time a change in the forward scatter pattern is detected, as evidenced by the transmitted light.

Figure 8:
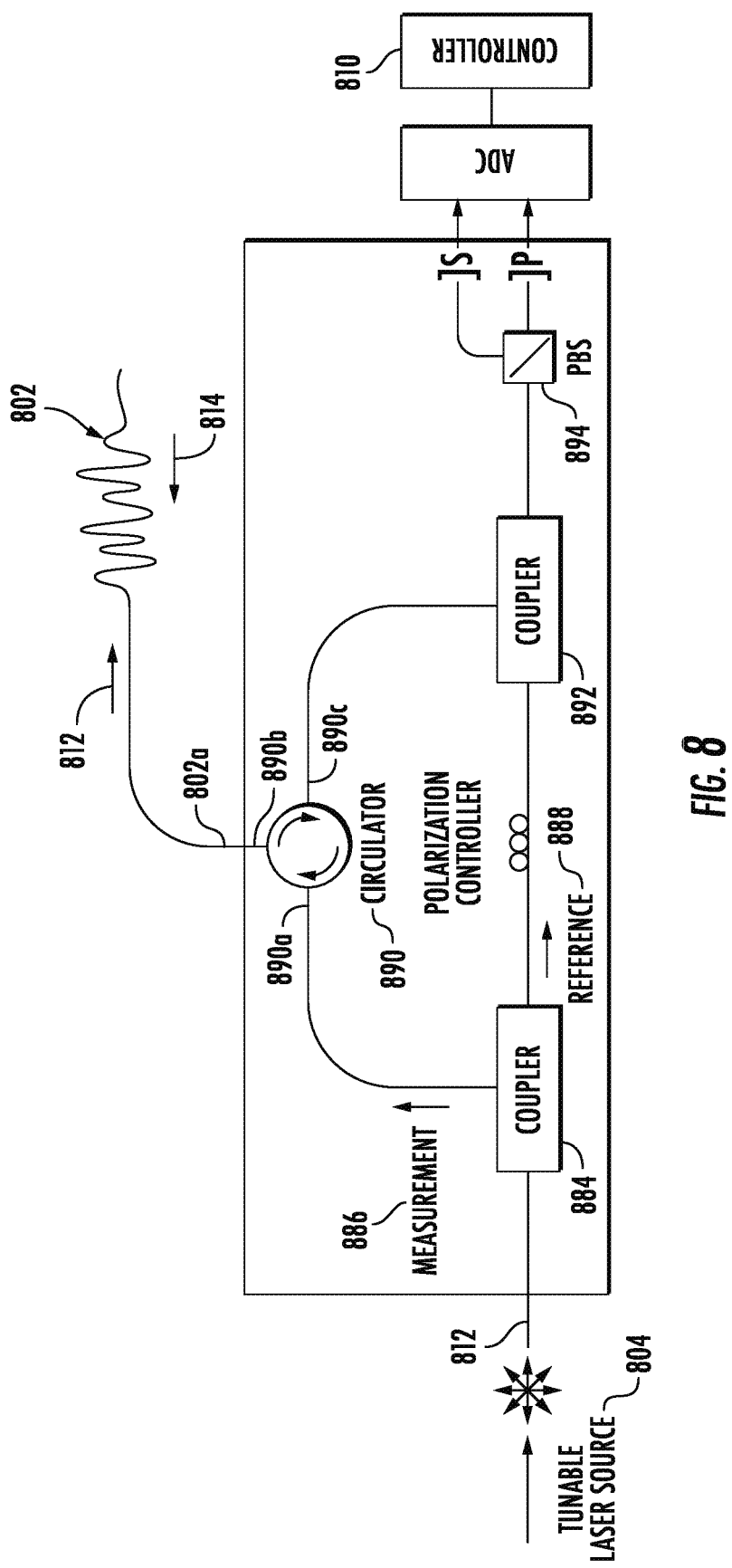
FIG. 8 illustrates an example block diagram of an example sensing interferometer used in accordance with an example embodiment of the present disclosure.

Referring now to FIG. 8, a detailed example of a sensing interferometer 880 is provided. In some embodiments, a sensing interferometer 880 may be utilized at the source end 802a of an optical fiber pattern 802. As depicted in FIG. 8, the sensing interferometer 880 receives light output 812 at one or more frequencies, for example, from a tunable laser source (e.g., illumination source 804). The sensing interferometer 880 includes a first coupler 884 configured to transmit a portion of the light output 812 as a measurement signal 886, and a portion of the light output 812 as a reference signal 888. The measurement signal 886 is transmitted to a circulator 890. As depicted in FIG. 8, the circulator 890 includes three ports 890a-890c. The circulator 890 is configured to receive the measurement signal 886 at a first port 890a and output the measurement signal 886 as light output 812 at a second port 890b, optically coupled to the source end 802a of the optical fiber pattern 802. As further depicted in FIG. 8, the circulator 890 is configured to receive reflected light at the second port 890b and output the reflected light 814 on the third port 890c.

As further depicted in FIG. 8, the sensing interferometer 880 includes a second coupler 892 configured to receive the reference signal 888 and the reflected light 814. By comparing the reflected light 814 with the reference signal 888, the coupler 892 in combination with an analog to digital converter (ADC) may generate a scatter pattern and/or determine a change in the scatter pattern. In some embodiments, the scatter pattern may be detected with an array sensor, without the need of a reference signal 888.

Figure 9:
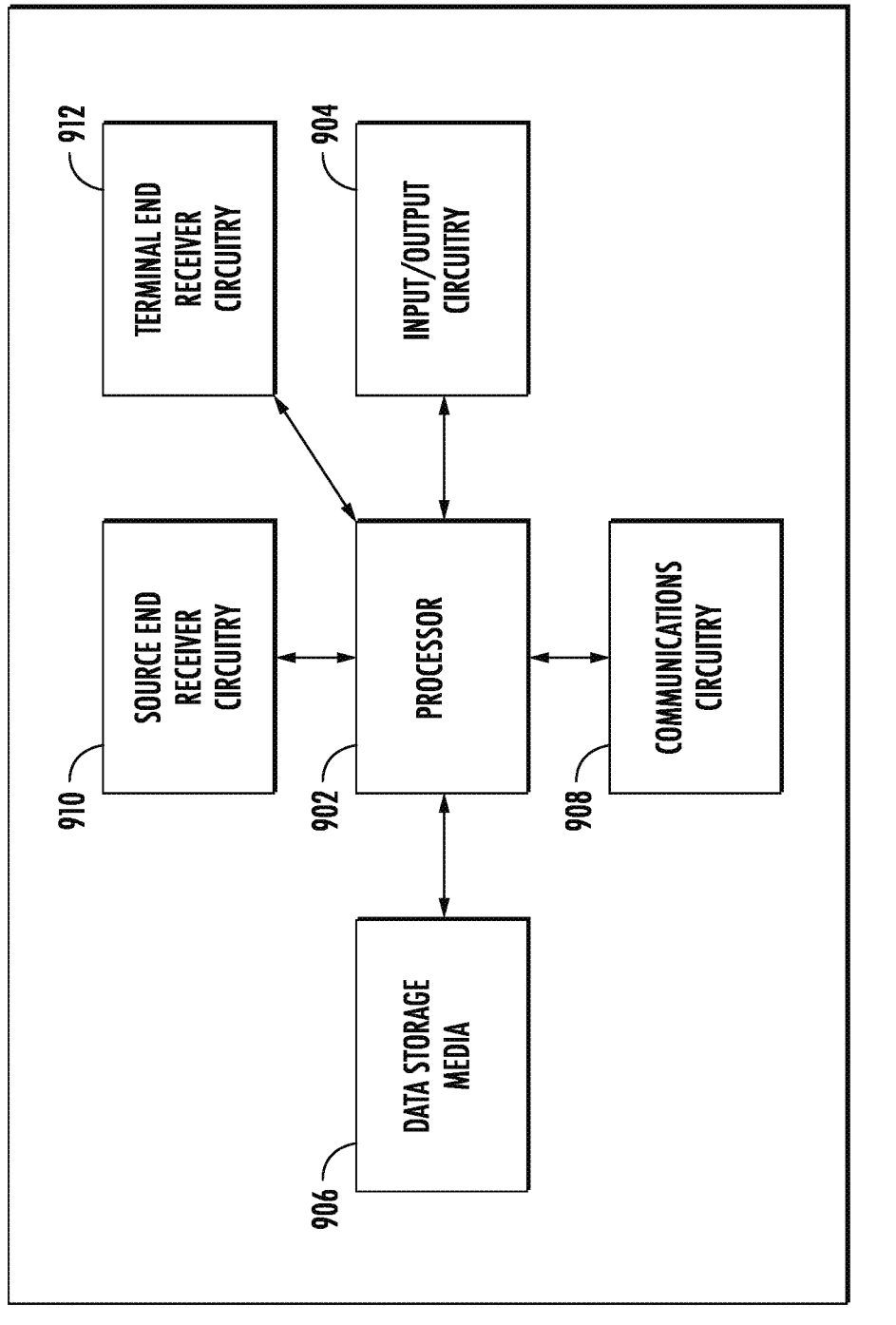
FIG. 9 illustrates an example block diagram of compute components of an example controller in accordance with an example embodiment of the present disclosure.

FIG. 9 illustrates an example controller 110 in accordance with at least some example embodiments of the present disclosure. The controller 110 includes processor 902, input/output circuitry 904, data storage media 906, communications circuitry 908, source end receiver circuitry 910, and terminal end receiver circuitry 912. In some embodiments, the controller 110 is configured, using one or more of the sets of circuitry 902, 904, 906, 908, 910, and/or 912, to execute and perform the operations described herein.

Although components are described with respect to functional limitations, it should be understood that the particular implementations necessarily include the use of particular computing hardware. It should also be understood that in some embodiments certain of the components described herein include similar or common hardware. For example, two sets of circuitry may both leverage use of the same processor(s), network interface(s), storage medium(s), and/or the like, to perform their associated functions, such that duplicate hardware is not required for each set of circuitry. The user of the term "circuitry" as used herein with respect to components of the apparatuses described herein should therefore be understood to include particular hardware configured to perform the functions associated with the particular circuitry as described herein.

Particularly, the term "circuitry" should be understood broadly to include hardware and, in some embodiments, software for configuring the hardware. For example, in some embodiments, "circuitry" includes processing circuitry, storage media, network interfaces, input/output devices, and/or the like. Alternatively, or additionally, in some embodiments, other elements of the controller 110 provide or supplement the functionality of other particular sets of circuitry. For example, the processor 902 in some embodiments provides processing functionality to any of the sets of circuitry, the data storage media 906 provides storage functionality to any of the sets of circuitry, the communications circuitry 908 provides network interface functionality to any of the sets of circuitry, and/or the like.

In some embodiments, the processor 902 (and/or co-processor or any other processing circuitry assisting or otherwise associated with the processor) is/are in communication with the data storage media 906 via a bus for passing information among components of the controller 110. In some embodiments, for example, the data storage media 906 is non-transitory and may include, for example, one or more volatile and/or non-volatile memories. In other words, for example, the data storage media 906 in some embodiments includes or embodies an electronic storage device (e.g., a computer readable storage medium). In some embodiments, the data storage media 906 is configured to store information, data, content, applications, instructions, or the like, for enabling the controller 110 to carry out various functions in accordance with example embodiments of the present disclosure.

The processor 902 may be embodied in a number of different ways. For example, in some example embodiments, the processor 902 includes one or more processing devices configured to perform independently. Additionally, or alternatively, in some embodiments, the processor 902 includes one or more processor(s) configured in tandem via a bus to enable independent execution of instructions, pipelining, and/or multithreading. The use of the terms "processor" and "processing circuitry" should be understood to include a single core processor, a multi-core processor, multiple processors internal to the controller 110, and/or one or more remote or "cloud" processor(s) external to the controller 110.

In an example embodiment, the processor 902 is configured to execute instructions stored in the data storage media 906 or otherwise accessible to the processor. Alternatively, or additionally, the processor 902 in some embodiments is configured to execute hard-coded functionality. As such, whether configured by hardware or software methods, or by a combination thereof, the processor 902 represents an entity (e.g., physically embodied in circuitry) capable of performing operations according to an embodiment of the present disclosure while configured accordingly. Alternatively, or additionally, as another example in some example embodiments, when the processor 902 is embodied as an executor of software instructions, the instructions specifically configure the processor 902 to perform the algorithms embodied in the specific operations described herein when such instructions are executed.

As one particular example embodiment, the processor 902 is configured to perform various operations associated with detecting a change (e.g., a deformation) on a surface. In some embodiments, the processor 902 includes hardware, software, firmware, and/or a combination thereof, that receives a reflected light electrical signal (e.g., reflected light electrical signal 120) corresponding to reflected light (e.g., reflected light 114, 214) received at a first optical receiver (e.g., optical receiver 106, 206) positioned at the source end of an optical fiber (e.g., optical fiber pattern 102, 202, 302, 402, 502, 602, 702, 802). Additionally, or alternatively, in some embodiments, the processor 902 includes hardware, software, firmware, and/or a combination thereof, that receives a transmitted light electrical signal (e.g., transmitted light electrical signal 122) corresponding to transmitted light (e.g., transmitted light 116, 216) received at a second optical receiver (e.g., optical receiver 108, 208) positioned at the terminal end of an optical fiber (e.g., optical fiber pattern 102, 202, 302, 402, 502, 602, 702, 802). Additionally, or alternatively, in some embodiments, the processor 902 includes hardware, software, firmware, and/or a combination thereof, that detects a change in the surface based at least in part on the reflected light and the transmitted light.

In some embodiments, the controller 110 includes input/output circuitry 904 that provides output to the user and, in some embodiments, to receive an indication of a user input. In some embodiments, the input/output circuitry 904 is in communication with the processor 902 to provide such functionality. The input/output circuitry 904 may comprise one or more user interface(s) (e.g., user interface) and in some embodiments includes a display that comprises the interface(s) rendered as a web user interface, an application user interface, a user device, a backend system, or the like. The processor 902 and/or input/output circuitry 904 comprising the processor may be configured to control one or more functions of one or more user interface elements through computer program instructions (e.g., software and/or firmware) stored on a memory accessible to the processor (e.g., data storage media 906, and/or the like). In some embodiments, the input/output circuitry 904 includes or utilizes a user-facing application to provide input/output functionality to a client device and/or other display associated with a user.

In some embodiments, the controller 110 includes communications circuitry 908. The communications circuitry 908 includes any means such as a device or circuitry embodied in either hardware or a combination of hardware and software that is configured to receive and/or transmit data from/to a network and/or any other device, circuitry, or module in communication with the controller 110. In this regard, the communications circuitry 908 includes, for example in some embodiments, a network interface for enabling communications with a wired or wireless communications network. Additionally, or alternatively in some embodiments, the communications circuitry 908 includes one or more network interface card(s), antenna(s), bus(es), switch(es), router(s), modem(s), and supporting hardware, firmware, and/or software, or any other device suitable for enabling communications via one or more communications network(s). Additionally, or alternatively, the communications circuitry 908 includes circuitry for interacting with the antenna(s) and/or other hardware or software to cause transmission of signals via the antenna(s) or to handle receipt of signals received via the antenna(s). In some embodiments, the communications circuitry 908 enables transmission to and/or receipt of data from a client device in communication with the controller 110.

The source end receiver circuitry 910 includes hardware, software, firmware, and/or a combination thereof, that supports various functionality associated with configuring and/or communicating with source end circuitry, such as an illumination source, a source end optical receiver, and/or a source end sensing interferometer. In some embodiments, the source end receiver circuitry 910 includes hardware, software, firmware, and/or a combination thereof to communicate with the source end circuitry according to established protocols to provide appropriate configuration and/or calibration parameters and/or to receive data provided by each component of the source end circuitry. In some embodiments, the source end receiver circuitry 910 includes a separate processor, specially configured field programmable gate array (FPGA), or a specially programmed application specific integrated circuit (ASIC).

The terminal end receiver circuitry 912 includes hardware, software, firmware, and/or a combination thereof, that supports various functionality associated with configuring and/or communicating with terminal end circuitry, such as a terminal end optical receiver. In some embodiments, the source end receiver circuitry 910 includes hardware, software, firmware, and/or a combination thereof to communicate with the source end circuitry according to established protocols to provide appropriate configuration and/or calibration parameters and/or to receive data provided by the source end circuitry. In some embodiments, the source end receiver circuitry 910 includes a separate processor, specially configured field programmable gate array (FPGA), or a specially programmed application specific integrated circuit (ASIC).

Additionally, or alternatively, in some embodiments, one or more of the sets of circuitry 902-912 are combinable. Additionally, or alternatively, in some embodiments, one or more of the sets of circuitry perform some or all of the functionality described associated with another component. For example, in some embodiments, one or more sets of circuitry 902-912 are combined into a single module embodied in hardware, software, firmware, and/or a combination thereof. Similarly, in some embodiments, one or more of the sets of circuitry, for example source end receiver circuitry 910, and/or terminal end receiver circuitry 912, is/are combined such that the processor 902 performs one or more of the operations described above with respect to each of these circuitry individually.

Figure 10:
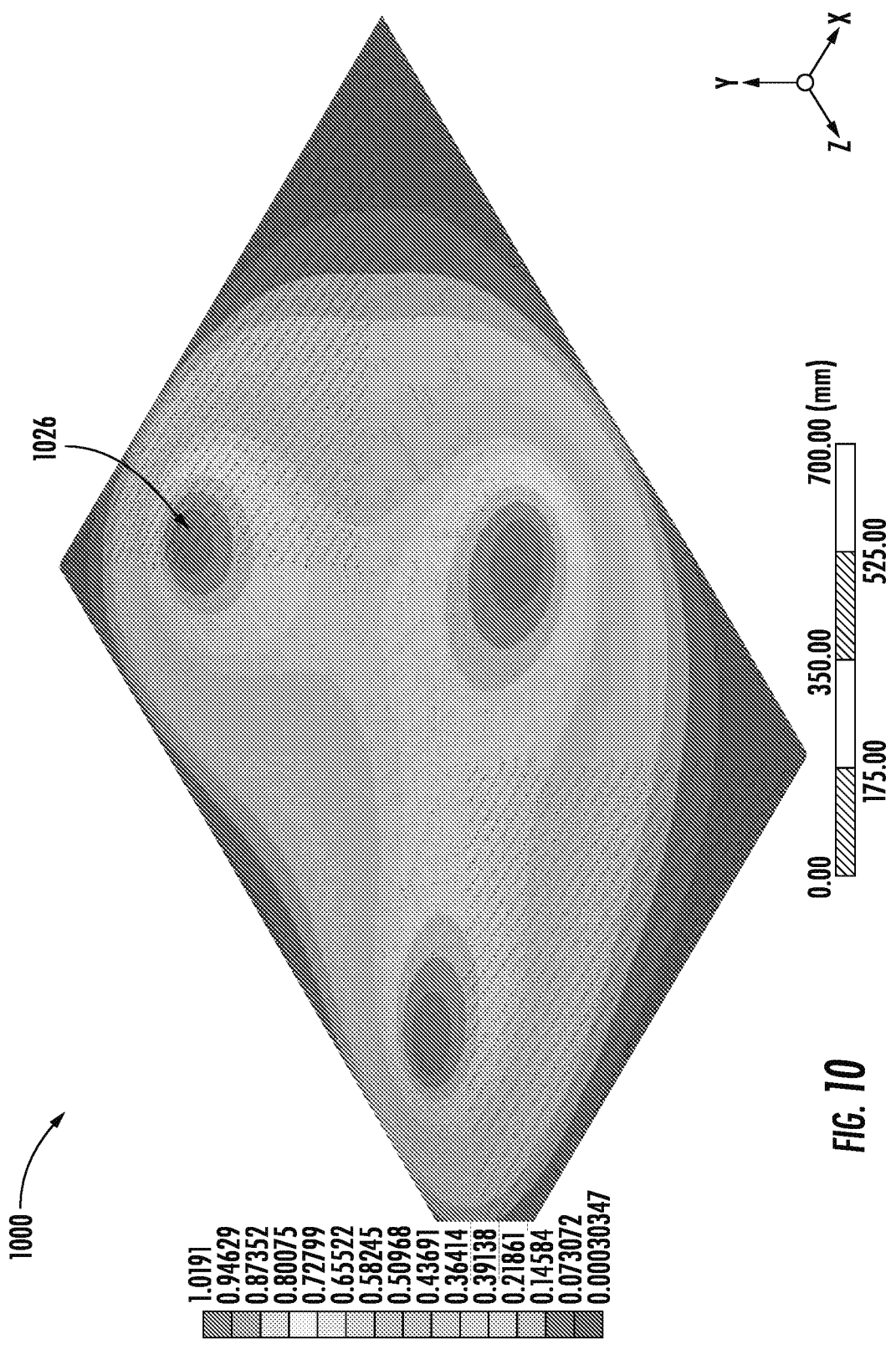
FIG. 10 illustrates an example three-dimensional model of a surface, generated in accordance with an example embodiment of the present disclosure.

Referring now to FIG. 10, an example three-dimensional model 1000 depicting a plurality of deformations 1026 on a surface is provided. As depicted in FIG. 10, a three-dimensional model 1000 of a surface may be generated based on the transmitted light (e.g., transmitted light 116, 216) and the reflected light (e.g., reflected light 114, 214, 814) received from an optical fiber pattern (e.g., 102, 202, 302, 402, 502, 602, 702, 802). As described herein, the precise position of a deformation, or other change to the surface may be determined based on the time difference between a change in the scatter pattern detected at the source end as compared to a change in the scatter pattern detected at the terminal end of the optical fiber pattern. In addition, the magnitude (e.g., height) of the deformation may be determined based on the forward and/or back scatter pattern. The position of the deformations and the magnitude of the deformations may be used to generate a three-dimensional model, such as the three-dimensional model 1000 depicted in FIG. 10. In some embodiments, the contours of the three-dimensional model 1000 may be modeled based on known properties of the surface modeled in conjunction with the deformations detected.

Referring now to FIG. 11, an example process 1100 for detecting a change in a surface (e.g., surface 224, 324, 424, 524, 624) using an optical fiber (e.g., optical fiber pattern 102, 202, 302, 402, 502, 602, 702, 802) is provided. At block 1102, the fiber optic profiler (e.g., fiber optic profiler 100, 200) transmits, by an illumination source (e.g., illumination source 104, 204, 804), a light output into a first end (e.g., source end 102a, 202a, 802a) of the optical fiber, wherein the optical fiber is positioned on the surface. As described herein, the illumination source may be a laser diode or similar source configured to transmit a light output, such as a light pulse or continuous light wave (e.g., light output 112, 212, 812). The illumination source is coupled to the first end of the optical fiber such that the light output is transmitted through the optical fiber. A portion of the light output may be reflected back to the source end of the optical fiber due to structures, aberrations, occlusions, stretching, compression, and other anomalies within the optical fiber (e.g., reflected light 114, 214, 814). A portion of the light output may reach the terminal end (e.g., terminal end 102b, 202b, 802b) of the optical fiber as transmitted light (e.g., transmitted light 116, 216, 816).

At block 1104, the fiber optic profiler receives reflected light at a first optical receiver (e.g., optical receiver 106, 206, sensing interferometer 880) positioned at the first end of the optical fiber. As described herein, the reflected light may be captured by a first optical receiver positioned at the source end of the optical fiber and configured to generate a back scatter pattern representative of the physical make-up of the optical fiber. In some embodiments, the back scatter pattern may be transmitted as a reflected light electrical signal (e.g., reflected light electrical signal 120) to a controller (e.g., controller 110, apparatus 900).

At block 1106, the fiber optic profiler receives transmitted light at a second optical receiver (e.g., optical receiver 108, 208) positioned at the second end of the optical fiber. As described herein, the transmitted light may be captured by a second optical receiver positioned at the terminal end of the optical fiber and configured to generate a forward scatter pattern representative of the physical make-up of the optical fiber. In some embodiments, the forward scatter pattern may be transmitted as a transmitted light electrical signal (e.g., transmitted light electrical signal 122) to the controller.

At block 1108, the fiber optic profiler detects a change in the surface based at least in part on the reflected light and the transmitted light. As described herein, the controller may detect a change, such as a deformation, in the attached surface and further determine the position and magnitude of the deformation. In one embodiment, the controller may detect a change in the surface based on a change to the forward scatter pattern received at the second optical receiver and/or the back scatter pattern received at the first optical receiver. In at least one embodiment, the controller may further detect the position of the deformation on the surface based on the time difference between the change in the forward scatter pattern received at the second optical receiver and the change in the back scatter pattern received at the first optical receiver. In some embodiments, a three-dimensional model, such as the three-dimensional model 1000 depicted in FIG. 10 may be generated based on the position and magnitude of deformations on the surface.

As described herein, in at least one embodiment, the fiber optic profiler may be utilized to detect a change and/or deformation in the surface of a battery housing (e.g., battery housing 332, 432, 532, 632). Such a determination may be an indication of a dangerous battery condition, such as a build-up of pressure, gases, and/or heat; and/or the onset of thermal runaway. Determining the position of the deformation utilizing both the forward scatter pattern and the back scatter pattern may enable the use of readily available and cheap electrical components.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components may be used in conjunction with the system. Therefore, it is to be understood that the inventions are not to be limited to the specific embodiments disclosed and that modifications and other embodiments are intended to be included within the scope of the appended claims. Moreover, the steps in the method described above may not necessarily occur in the order depicted in the accompanying diagrams, and in some cases one or more of the steps depicted may occur substantially simultaneously, or additional steps may be involved. Although specific terms are employed herein, they are used in a generic and descriptive sense only and not for purposes of limitation.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. The disclosed embodiments relate primarily to a battery housing on an electric vehicle, however, one skilled in the art may recognize that such principles may be applied to any surface for which detection of changes to the surface using fiber optics may be beneficial. Alternative embodiments that result from combining, integrating, and/or omitting features of the embodiment(s) are also within the scope of the disclosure. Accordingly, the scope of protection is not limited by the description set out above.

Additionally, the section headings used herein are provided for consistency with the suggestions under 37 C.F.R. 1.77 or to otherwise provide organizational cues. These headings shall not limit or characterize the invention(s) set out in any claims that may issue from this disclosure.

Use of broader terms such as "comprises," "includes," and "having" should be understood to provide support for narrower terms such as "consisting of," "consisting essentially of," and "comprised substantially of" Use of the terms "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

The invention claimed is:

1. An apparatus, comprising:
   an optical fiber having a first end and a second end,
      wherein the optical fiber is positioned on a surface;
   an illumination source configured to:
      transmit a reference signal to a first optical receiver; and
      emit a light output into the first end of the optical fiber;
   the first optical receiver configured to:
      receive reflected light at the first end of the optical fiber; and
      receive the reference signal from the illumination source;
   a second optical receiver configured to receive transmitted light at the second end of the optical fiber; and
   a controller configured to detect
   a change in the surface based at least in part on the reflected light, the reference signal, and the transmitted light.

2. The apparatus of claim 1, wherein the optical fiber is disposed on the surface in a two-dimensional pattern.

3. The apparatus of claim 1, wherein the controller is further configured to determine a two-dimensional position of the detected change in the surface.

4. The apparatus of claim 3, wherein the first optical receiver is further configured to determine a back scatter pattern, and wherein the second optical receiver is further configured to determine a forward scatter pattern.

5. The apparatus of claim 4, wherein the two-dimensional position of the change in the surface is determined based on a time difference between a back scatter pattern change and a forward scatter pattern change.

6. The apparatus of claim 1, wherein the change in the surface is a deformation of the surface.

7. The apparatus of claim 6, wherein the controller is further configured to determine a magnitude of the deformation of the surface based at least in part on at least one of the transmitted light and the reflected light.

8. The apparatus of claim 1, wherein the controller is further configured to generate a three-dimensional model of the surface based at least in part on the transmitted light and the reflected light.

9. The apparatus of claim 8, wherein the three-dimensional model includes a two-dimensional position of the change in the surface, and a magnitude of the change in the surface.

10. The apparatus of claim 1, wherein the surface comprises at least a portion of a battery housing.

11. The apparatus of claim 1, wherein the controller is further configured to determine a dangerous battery condition based at least in part on the change in the surface.

12. The apparatus of claim 1, wherein the illumination source is a laser diode configured to emit a laser pulse.

13. A method comprising:

transmitting, by an illumination source, a light output into a first end of an optical fiber, and a reference signal, wherein the optical fiber is positioned on a surface;

receiving reflected light at a first optical receiver positioned at the first end of the optical fiber;

receiving, by the first optical receiver, the reference signal from the illumination source;

receiving transmitted light at a second optical receiver positioned at a second end of the optical fiber; and detecting a change in the surface based at least in part on the reflected light, the reference signal, and the transmitted light.

14. The method of claim 13, wherein the optical fiber is disposed on the surface in a two-dimensional pattern.

15. The method of claim 13, further comprising determining a two-dimensional position of the change in the surface.

16. The method of claim 15, further comprising:

receiving a back scatter pattern at the first optical receiver; and receiving a forward scatter pattern at the second optical receiver.

17. The method of claim 16, wherein determining the two-dimensional position of the change in the surface, further comprises:

determining a time difference between a back scatter pattern change and a forward scatter pattern change.

18. The method of claim 13, wherein the surface comprises at least a portion of a battery housing.

19. The method of claim 18, further comprising determining a dangerous battery condition based at least in part on the change in the surface.

* * * * *